US 6,647,435 B1

(12) United States Patent
Koh et al.

(10) Patent No.: US 6,647,435 B1
(45) Date of Patent: Nov. 11, 2003

(54) METHOD AND APPARATUS SYSTEM WITH FIRST AND SECOND CONTROLLER CONNECTED VIA UART CHIP FOR CONTROLLING PERIPHERAL DEVICE OF COMPUTER SYSTEM IN SECOND POWER MODE

(75) Inventors: Young-ok Koh, Yongin (KR); Jum-soon Seo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/475,238

(22) Filed: Dec. 30, 1999

(30) Foreign Application Priority Data

Oct. 22, 1999 (KR) ........................................ 1999-45962
Dec. 28, 1999 (KR) ........................................ 1999-63313

(51) Int. Cl.[7] ........................... G06F 3/00; G06F 13/24; G06F 1/26
(52) U.S. Cl. ........................... 710/14; 710/8; 710/38; 710/48; 713/320; 713/323; 713/324
(58) Field of Search ............................... 710/8, 48, 14, 710/38; 713/1, 320, 323, 324

(56) References Cited

U.S. PATENT DOCUMENTS

| 5,574,447 A | * | 11/1996 | Roylance ..................... 341/22 |
| 5,579,524 A | * | 11/1996 | Kikinis ........................ 307/65 |
| 5,815,679 A | * | 9/1998 | Liu ............................. 710/311 |
| 6,006,337 A | * | 12/1999 | Koo ............................ 713/324 |
| 6,226,237 B1 | * | 5/2001 | Chan et al. ................... 710/14 |
| 6,279,056 B1 | * | 8/2001 | Jacobs et al. ................. 710/14 |
| 6,378,077 B1 | * | 4/2002 | Atkinson ..................... 713/324 |
| 6,412,075 B1 | * | 6/2002 | Klein .......................... 713/322 |
| 6,502,003 B1 | * | 12/2002 | Jacobs et al. ................. 700/95 |

* cited by examiner

Primary Examiner—Jeffrey Gaffin
Assistant Examiner—Tammara Peyton
(74) Attorney, Agent, or Firm—Staas & Halsey LLP

(57) ABSTRACT

A method and apparatus for driving a peripheral device of a personal multimedia system. The peripheral device driving apparatus includes a first controller installed in the personal multimedia system, for converting the key input by a function key selected by a user in a software-off mode or power-save mode into command data corresponding to the key input, a second controller installed in the peripheral device, for decoding the command data to perform the function indicated by the command data, and an interface device (for example, an Universal Asynchronous Receiver/Transmitter (UART)) for transmitting the command data from the first controller to the second controller for the peripheral device to operate. Thus, as long as power is supplied to the first and second controllers, a particular peripheral device can be simply operated by only the operation of function keys of a key pad within a short period of time by serial communications, thereby improving the convenience of use of the drive of the peripheral device.

25 Claims, 2 Drawing Sheets

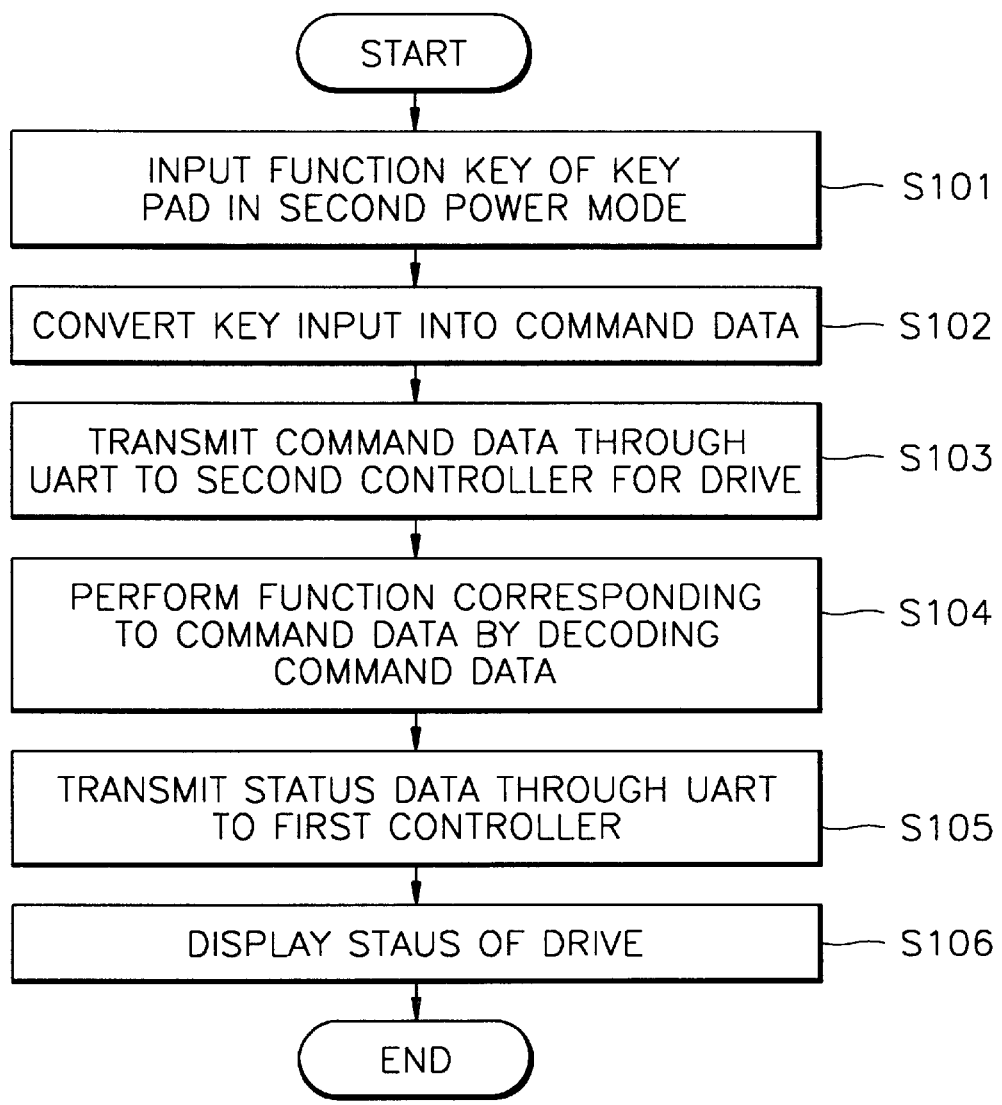

METHOD AND APPARATUS SYSTEM WITH FIRST AND SECOND CONTROLLER CONNECTED VIA UART CHIP FOR CONTROLLING PERIPHERAL DEVICE OF COMPUTER SYSTEM IN SECOND POWER MODE

CROSS-REFERENCE TO RELATED APPLICATIONS

This application claims the benefit of Korean Application Nos. 99-45962, filed Oct. 22, 1999 and 99-63313, filed Dec. 28, 1999, in the Korean Patent Office, the disclosures of which are incorporated herein by reference.

BACKGROUND OF THE INVENTION

1. Field of the Invention

The present invention relates to a personal multi-media system, and more particularly, a method and apparatus for driving a particular peripheral device connected to a personal computer in a second power mode exclusive of a first power mode corresponding to a normal mode.

2. Description of the Related Art

In personal multi-media systems such as personal computers (PCs), turning on the system allows its central processing unit (CPU) to initialize the operating system (OS), and in turn to transmit commands to microcontrollers for controlling drives, thereby initializing operation of peripheral devices such as a hard disk drive, a floppy disk drive, an optical disk drive, and a printer. The initialization permits the use of application programs according to the use of each peripheral device, for example, playing of music by using the optical disk drive, or printing by using the printer.

Thus, common driving of peripheral devices is achieved by transmitting command data required to control drives of the devices to a microcontroller for controlling individual drives of the devices via a predetermined interface device. The interface device refers to a parallel-to-parallel interface device which allows parallel communications between the CPU and the microcontroller.

However, the problem with such a conventional peripheral device driving technique is that when a user intends to use a particular peripheral device attached to or connected to a PC, such as an optical disk drive, the OS and all the peripheral devices connected to the PC must first be initialized or mounted to drive the particular peripheral device the user desires to operate in a PC power ON state, which forces a user to wait for a longer period of time, and consumes a considerable amount of power by initializing all peripheral devices attached to the PC including unwanted devices.

SUMMARY OF THE INVENTION

To solve the above problems, it is an object of the present invention to provide a method of driving a particular peripheral device a user intends to operate in a second power mode exclusive of a first power mode corresponding to a normal state in a personal multimedia system.

It is another object of the present invention to provide a simple method of driving a particular peripheral device in a power-save mode or a software-off mode in a personal multimedia system.

It is still another object of the present invention is to provide an apparatus for driving a particular peripheral device a user intends to operate in a second power mode exclusive of a first power mode corresponding to a normal state in a personal multimedia system.

It is yet still another object of the present invention to provide an apparatus for driving a particular peripheral device in a power-save mode or software-off mode in a personal multimedia system.

Additional objects and advantages of the invention will be set forth in part in the description which follows and, in part, will be obvious from the description, or may be learned by practice of the invention.

An aspect of the present invention is achieved by a method of driving a peripheral device of a personal multimedia system having first and second power modes. The peripheral device driving method comprises: converting a selection of a function key selected by a user into command data corresponding to the selected function key in the second power mode by a first controller which is installed in the personal multimedia system to control the peripheral device; transmitting the command data by serial communications to a second controller for controlling the drive in the peripheral device; and decoding the command data by the second controller in the second power mode, to carry out the function indicated by the command data, wherein only the peripheral device a user intends to operate is operated in the second power mode. In the present invention, the first controller controls a peripheral device through a Universal Asynchronous Receiver/Transmitter instead of a central processing unit performing such a function.

Another aspect of the present invention is achieved by an apparatus for driving a peripheral device in a personal multimedia system interfacing with the peripheral device via a first interface device in a first power mode. The peripheral device driving apparatus comprising: a first controller installed in the personal multimedia system, to convert a selection of a function key selected by a user in a second power mode into command data corresponding to the selected function key; a second controller installed in the peripheral device, to decode the command data still in the second power mode to perform the function indicated by the command data; and a second interface device to transmit the command data from the first controller to the second controller for the peripheral device to operate in the second power mode.

BRIEF DESCRIPTION OF THE DRAWINGS

The above objects and advantages of the present invention will become more apparent by describing in detail a preferred embodiment thereof with reference to the attached drawings, in which:

FIG. 2 is a flowchart illustrating a method of driving a peripheral device of a personal multimedia system according to an embodiment of the present invention.

DETAILED DESCRIPTION OF THE INVENTION

Figure 1:
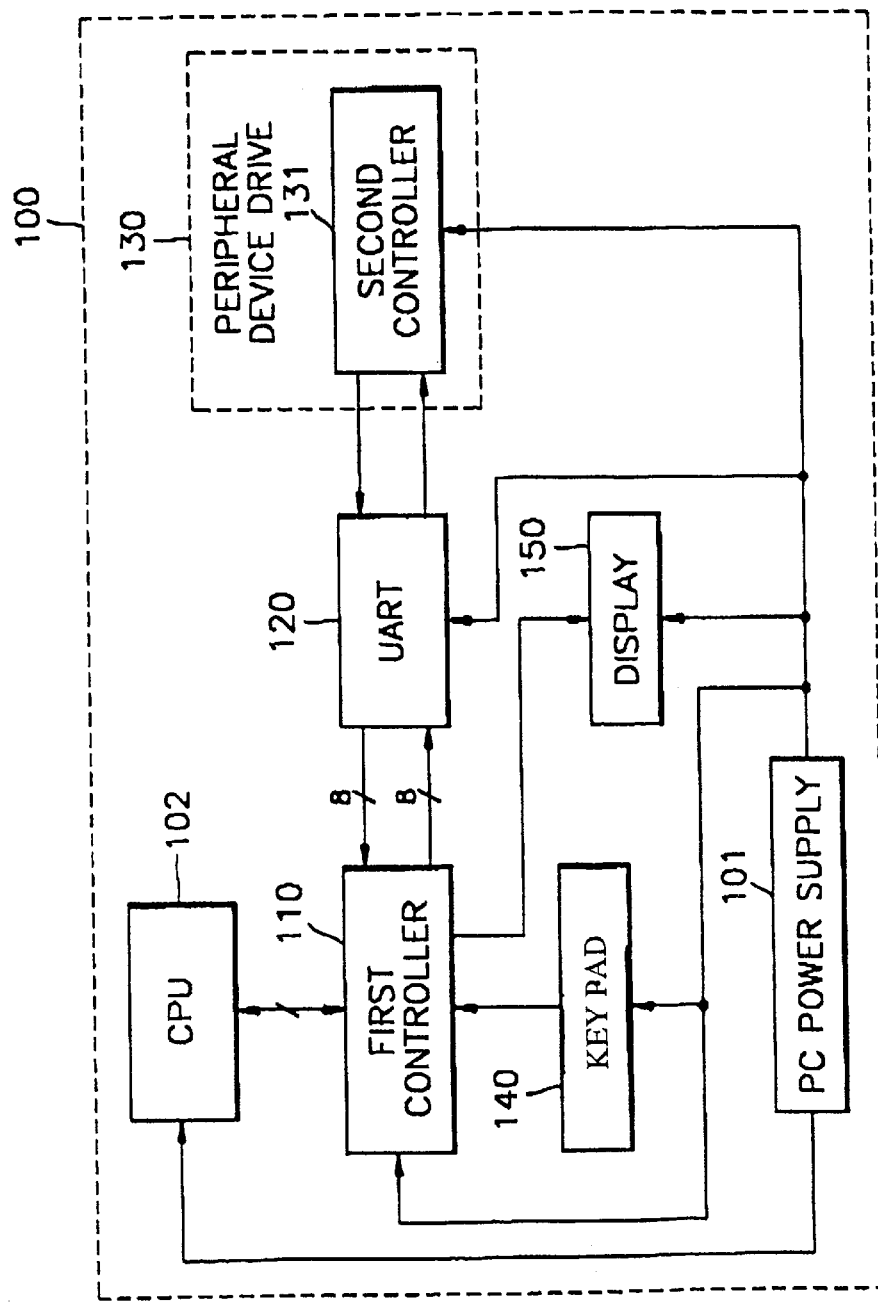
FIG. 1 is a block diagram of a peripheral device driving apparatus of a personal multimedia system according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

A precondition for the enablement of the present invention is that the peripheral device controller (referred to as "first controller") and controller (referred to as "second controller") for drive installed in each peripheral device should be "alive" in a power-off state. In other words, power should always be supplied to the controllers. This precondition is set based on the fact that the power supply is maintained on units other than the motherboard having the CPU even in a power-off mode while the power supply cord of the PC is plugged in.

A "hardware-off" mode is defined as a state where the power supply cord of the PC is not plugged in, a "software-off" mode is defined as a state where the power supply cord of the PC is plugged in to supply power to the controllers while the power switch of the PC is turned off, and the "power-save" mode is defined as a state where power consumption is lowered to a minimum level when no command is input for a predetermined period of time while the power switch of the PC is turned on. In the present invention, a normal mode where a normal operation is carried out by applying power to a PC is referred to as a "first power mode", and another power mode including the software-off mode or power-save mode, where the power is supplied to only a first controller, a second controller and a key pad with function keys for operating the drive, is referred to as a "second power mode". Referring to FIG. 1, a peripheral device driving apparatus 100 of a personal multimedia system according to an embodiment of the present invention is shown. In the peripheral device driving apparatus shown in FIG. 1, a PC power supply 101 is turned on, allowing power to only a first controller 110, a Universal Asynchronous Receiver/Transmitter (UART) 120, a second controller 131, a key pad 140, and a display 150 in a software-off mode or power-save mode, and not to a central processing unit (CPU). The first controller 110 usually serves to transmit command data which allows initialization by the CPU 102 by recognizing a key input from a keyboard (not shown) in a normal mode. However, in the present invention, the first controller 110 operates to control the operation of the peripheral device by a key input from a key pad 140 in a software-off mode or power-save mode.

In the configuration of the peripheral device driving apparatus 100, the key pad 140 with function keys for operation of the peripheral device drive 130 is installed outside a PC case. Alternatively, the key pad 140 may be installed outside a peripheral device drive 130. The first controller 110 has ports allocated to receive respective key inputs from the key pad 140.

The first controller 110 communicates with the second controller 131 through two lines in a serial mode, one line for transmitting command data from the first controller 110 to the second controller 131, and the other line for transmitting status data of the drive from the second controller 131 to the first controller 110.

The communications between the controllers is achieved by the UART 120, which is a type of microchip for supporting interfacing between a parallel communication type device and a serial communication type device. The UART 120 according to the present invention converts the parallel command data from the first controller 110 installed in the PC into serial data, and transmits the serial command data to the second controller 131 installed in the peripheral device. Also, the UART 120 converts the serial status data from the second controller 131 into parallel data and transmits the parallel status data to the first controller 110.

In detail, a parallel-to-parallel interface device (not shown) for interfacing in a normal mode between the CPU 102 and the peripheral device drive 130 is referred to as "first interface device", and the UART 120 for interfacing in a second power mode between the first controller 110 and the second controller 131 is referred to as "serial-to-parallel interface device" or "second interface device".

The first controller 110 receives the status data from the second controller 131 to display the status data on the display 150 such as a liquid crystal display (LCD), notifying the user of the current drive status.

Referring to FIG. 2, which illustrates an embodiment of a peripheral device driving method of a personal multimedia system according to the present invention, when a user selects one of the function keys on an external key pad in a second power mode, the first controller 110 senses the key input on the key pad (S101), and converts the key input into command data in 1-byte units corresponding to the function selected by the user (S102).

The parallel command data is converted into serial data via a serial communications mode (via the UART 120) and in turn is transmitted to the second controller 131 (S103). Since the first controller adopts a parallel communications mode and the second controller adopts a serial communications mode, the UART 120 is interposed therebetween to match the communications mode of the two controllers 110, 131. The second controller 131 receives and decodes the command data to perform the function in accordance with the command data (S104).

The second controller 131 transmits the status data of the drive of the peripheral device through the UART 120 to the first controller 110 (S105). The UART 120 converts the serial data of the status data received from the second controller into parallel data, and transmits the parallel data of the status data to the first controller 110.

The first controller 110 displays the current drive status, for example, PLAY, STOP or PAUSE status, on a liquid crystal display (LCD) 150 with reference to the received status data. If the drive is in an abnormal state, the second controller 131 transmits error status data through the UART 120 to the first controller 110, and in turn the first controller 110 controls the display of the error message on the LCD 150.

As described above, the present invention can simply operate a particular peripheral device in the second power mode by the operation of the function keys of the key pad within a short period of time, improving the convenience of use of the drive of the peripheral device. In particular, when a user intends to listen to music recorded on an optical disk, the optical disk drive attached to or connected to a PC can be operated as simply as operating a general audio system, without a need to turn the PC on.

The present invention prevents the power consumption by peripheral devices other than the device a user desires to operate.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of driving a peripheral device of a personal multimedia system having first and second power modes, comprising:
   converting a selection of a function key selected by a user into command data corresponding to the selected function key in the second power mode by a first controller which is installed in the personal multimedia system to control the peripheral device;

transmitting the command data by a serial communications mode to a second controller for controlling the drive in the peripheral device; and decoding the command data by the second controller in the second power mode, to carry out the function indicated by the command data, wherein only the peripheral device a user intends to operate is operated in the second power mode.

2. The method of claim 1, wherein the serial communication mode is carried out by a Universal Asynchronous Receiver/Transmitter (UART).

3. The method of claim 1, wherein in the second power mode, power is supplied to only the first and second controllers.

4. The method of claim 1, wherein the second power mode is a software-off mode or a power-save mode, and the first power mode is a normal operating mode.

5. The method of claim 1, wherein the function key is installed outside the case of the personal multimedia system or outside the peripheral device.

6. The method of claim 1, wherein the peripheral device is an optical disk drive.

7. The method of claim 1, further comprising transmitting drive status data of the peripheral device from the second controller to the first controller.

8. The method of claim 7, further comprising displaying the drive status received by the first controller from the second controller.

9. The method of claim 1, wherein the transmitting of the command data comprises:

converting the command data output from the first controller in parallel form to serial form; and transmitting the serial command data to the second controller.

10. The method of claim 7, wherein the transmitting of the drive status data comprises:

converting the drive status data output from the second controller in serial form to parallel form; and transmitting the drive status data to the first controller.

11. A method of using a computer system having a first controller to control a plurality of peripheral devices of the computer system, wherein each of the peripheral devices has a second controller to control a drive of the respective peripheral device, the method comprising:

receiving an input to the first controller from a user to select one of the peripheral devices to operate in a particular power mode;

supplying power to the first controller and the second controller of the selected peripheral device, without supplying power to the second controllers of the other peripheral devices in the particular power mode;

outputting parallel command data from the first controller in response to the input from the user;

converting the parallel command data to serial command data; and transmitting the serial command data to the second controller of the selected peripheral device to drive the selected peripheral device.

12. The method of claim 11, wherein the computer system further comprises a central processing unit, the method further comprising:

not supplying power to the central processing unit in the particular power mode.

13. The method of claim 11, further comprising:

transmitting drive status data of the peripheral device from the second controller of the selected peripheral device to the first controller.

14. The method of claim 13, wherein the transmitting of the drive status data comprises:

converting the drive status data output from the second controller of the selected peripheral device in serial form to parallel form; and transmitting the drive status data to the first controller.

15. An apparatus driving a peripheral device in a personal multimedia system interfacing with the peripheral device via a first interface device in a first power mode, the peripheral device driving apparatus comprising:

a first controller installed in the personal multimedia system, to convert a selection of a function key selected by a user in a second power mode into command data corresponding to the selected function key;

a second controller installed in the peripheral device, to decode the command data in the second power mode to perform the function indicated by the command data; and a second interface device to transmit the command data from the first controller to the second controller for the peripheral device to operate in the second power mode, wherein the second interface device is a serial-to-parallel interface device to convert the command data in parallel form from the first controller to serial form, and transmit the serial command data to the second controller, and to convert the drive status data in serial form from the second controller to parallel form and transmit the parallel drive status data to the first controller; and the first interface device is a parallel-to-parallel interface device.

16. The apparatus of claim 15, wherein the second controller transmits drive status data of the peripheral device through the second interface device to the first controller.

17. The apparatus of claim 15, further comprising a display to display the drive status of the peripheral device in the second power mode.

18. The apparatus of claim 15, wherein the second interface device is a Universal Asynchronous Receiver/Transmitter (UART).

19. The apparatus of claim 15, wherein in the second power mode, power is supplied to only the first and second controllers, and the second interface device.

20. The apparatus of claim 15, wherein the second power mode is a software-off mode or a power-save mode, and the first power mode is a normal operating mode.

21. The apparatus of claim 15, further comprising a key pad with the function key operating in the second power mode, and the key pad is installed outside a case of the personal multimedia system or outside the peripheral device.

22. The apparatus of claim 15, wherein the peripheral device is an optical disk drive.

23. An apparatus for driving a plurality of peripheral devices using a computer system, comprising:

a first controller, mounted in the computer system, to control the plurality of peripheral devices, and to output parallel command data in response to an input in a particular power mode;

a plurality of second controllers, respectively mounted in the peripheral devices, to control a drive of the respective peripheral devices; and a power supply to supply power to the first controller and a selected one of the second controllers, without supplying power to the second controllers of the other peripheral units in a particular power mode; and an interface unit to convert the parallel command data to serial command data and transmit the serial command data to the second controller of the selected peripheral device in the particular power mode;

wherein the first controller, in response to an input, controls the second controller of the selected peripheral device to drive the selective peripheral device in the particular power mode.

24. The apparatus of claim 23, further comprising:

a central processing unit;

wherein the power supply does not supply power to the central processing unit in the particular power mode.

25. The apparatus of claim 24, wherein the power supply provides power to the central processing unit in another power mode different from the particular power mode, and the central processing unit controls the second controller of the selected peripheral device to drive the selected peripheral device in the another power mode.

* * * * *